Figure 1:
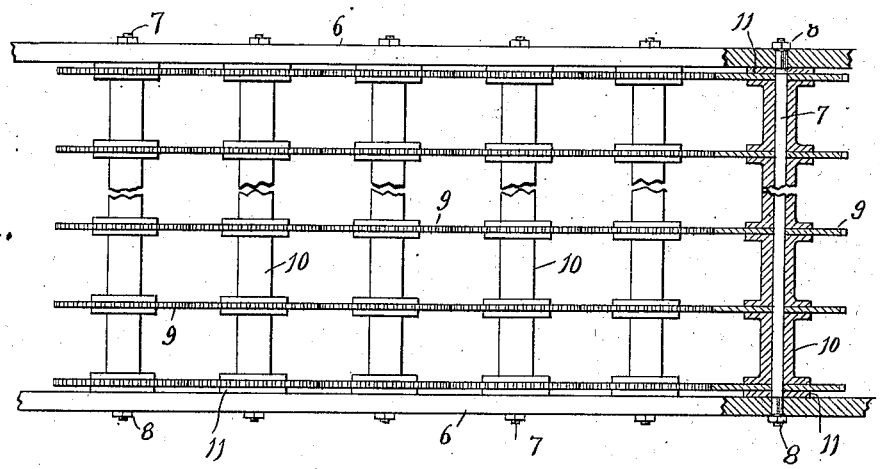

No. 727,765. PATENTED MAY 12, 1903.
D. W. EMERSON & P. KEENAN.
CATTLE GUARD.
APPLICATION FILED JULY 21, 1902.
NO MODEL.

Witnesses.
Inventors.
David W. Emerson
Peter Keenan

No. 727,765. Patented May 12, 1903.

UNITED STATES PATENT OFFICE.

DAVID W. EMERSON AND PETER KEENAN, OF BUTTERNUT, WISCONSIN.

CATTLE-GUARD.

SPECIFICATION forming part of Letters Patent No. 727,765, dated May 12, 1903.

Application filed July 21, 1902. Serial No. 116,340. (No model.)

*To all whom it may concern:*

Be it known that we, DAVID W. EMERSON and PETER KEENAN, residing at Butternut, in the county of Ashland and State of Wisconsin, have invented a new and useful Improvement in Cattle-Guards, of which the following is a description, reference being had to the accompanying drawings, which are a part of this specification.

This invention relates to guards for cattle and other animals, and especially to railway cattle-guards.

The object of this invention is to produce a railway cattle-guard having a movable sectional floor or bed which will form an insecure and apparently treacherous footing to cattle attempting to cross over it. This and other objects are attained by means of a guard constructed as described in the specification and in the several forms illustrated in the drawings presented herewith, in which—

Figure 2:
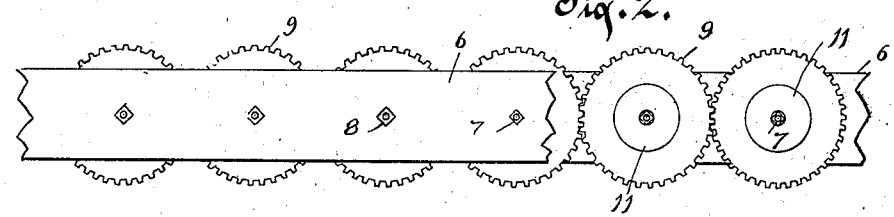
Figure 3:
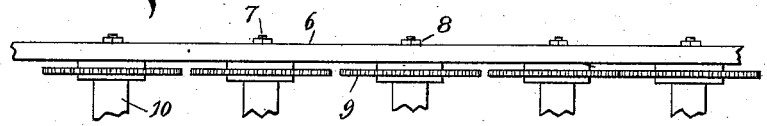

Figure 1 is a plan view of a fragment of a section of a cattle-guard embodying this invention with a portion thereof shown in section. Fig. 2 is a side view of the device illustrated in Fig. 1 with a portion of one side plate thereof broken away to better illustrate the interior construction. Fig. 3 is a fragmentary plan view of a modified form of this device.

Throughout the several views like elements are denoted by like characters.

The device will preferably be formed in several sections of suitable length, and one section will be placed each side of a single track, while two will be placed between the rails of the track. Each section will preferably be formed with side plates 6, secured together by means of cross-rods 7, which are provided with reduced squared portions lying within squared openings therefor in the side plates 6 and threaded ends for receiving nuts 8, which are turned against the side plates. The rods 7 are round, and as many may be utilized as desired, and upon each rod, as shown in Fig. 1, a series of circular toothed members 9 are mounted. These toothed members are in the nature of gear-wheels and are preferably spaced apart by spool-shaped spacers 10 and apart from the side plates by means of washers 11. In Fig. 1 the revoluble members 9 are shown in mesh with the members on the rod next thereto, so that when one member of a series is revolved all of the members in line therewith will be revolved.

In Fig. 3 a modified form of device is illustrated, and in this the revoluble members on the two outer end rods only are in mesh, while the series of revoluble members mounted on the intermediate rods are shown out of mesh or not in contact one with the other.

It will be seen that with the device illustrated an insecure and treacherous footing only is provided for cattle or other animals attempting to cross over the device, and the revoluble members are intended when stepped on by cattle to create fear in them, and thus accomplish the purpose of the invention.

It will be understood that we do not limit this invention to the exact constructions shown nor to the particular form of revoluble members shown. The protruding elements or teeth of the revoluble members may be modified in form to present a more or less dangerous footing for animals. The sections of the device may be suitably mounted by proper means either on the ties proper or in a framework substituted in place of the ties at the point where the device is to be used.

What we claim as our invention is—

In a cattle-guard, a plurality of laterally-extending supporting-rods, a series of toothed members revolubly mounted on each rod and intermeshing with the toothed members carried by the rod located next thereto.

In testimony whereof we affix our signatures in presence of two witnesses.

DAVID W. EMERSON.
PETER KEENAN.

Witnesses:
A. L. WEISBROD,
PAUL KANNEBERG.